United States Patent [19]
Reynolds

[11] 3,988,499
[45] Oct. 26, 1976

[54] STORAGE BAG AND METHOD FOR USING SAME

[76] Inventor: Thomas D. Reynolds, 441 Flynt Valley Drive, Winston-Salem, N.C. 27104

[22] Filed: Sept. 8, 1975

[21] Appl. No.: 611,580

Related U.S. Application Data

[62] Division of Ser. No. 542,738, Jan. 20, 1975, abandoned.

[52] U.S. Cl. .............................. 428/474; 206/45.33; 206/484; 206/497; 206/808; 428/518; 428/523; 428/918
[51] Int. Cl.² .................. B65D 65/18; B32B 27/30; B32B 27/32; B32B 27/34
[58] Field of Search ........... 428/474, 500, 515, 518, 428/520, 522, 523, 911, 918; 206/497, 808, 45.33, 484

[56] References Cited
UNITED STATES PATENTS

| | | | |
|---|---|---|---|
| 3,219,506 | 11/1965 | Dusina et al. | 156/220 |
| 3,423,231 | 1/1969 | Lutzmann | 428/474 |
| 3,533,548 | 10/1970 | Taterka | 229/48 |
| 3,547,257 | 12/1970 | Armentrout | 206/63.2 |
| 3,595,740 | 7/1971 | Gerow | 428/474 X |
| 3,600,267 | 8/1971 | McFedries et al. | 428/518 X |
| 3,661,677 | 5/1972 | Wang | 428/474 X |
| 3,666,604 | 5/1972 | Coffet | 161/2 |
| 3,685,720 | 8/1972 | Brady | 229/62 |
| 3,908,070 | 9/1975 | Marzolf | 428/474 |
| 3,912,843 | 10/1975 | Brazier | 428/518 X |
| 3,955,040 | 5/1976 | Schirmer | 428/474 |

*Primary Examiner*—Harold Ansher
*Attorney, Agent, or Firm*—Grover M. Myers; Manford R. Haxton

[57] ABSTRACT

A storage bag made of a composite film material of two or more plys of plastic film for use in vacuum packaging fresh perishables, such as fresh cuts of meat. The film composite has a matted finish on the inside surface of its inner layer which causes the film to have a translucent appearance. The areas of the bag which are sealed together during the packaging process become transparent to provide a visual inspection for a proper seal.

1 Claim, 4 Drawing Figures

STORAGE BAG AND METHOD FOR USING SAME

This is a division of application Ser. No. 542,738, filed Jan. 20, 1975, now abandoned.

BACKGROUND OF THE INVENTION

This invention relates to a method of making and using packaging material for perishables, such as fresh meats, processed meats, fish, cheese and the like. More particularly, this invention relates to a film material and a method for packaging with such film material to extend the storage time and prevent spoilage of fresh bulk cuts of meats (which are referred to as primal and sub-primal cuts) which are vacuum packaged by providing a visual inspection system whereby improperly sealed packages are immediately recognizable.

In the past, many producers of films have used various types of film composites, such as a composite of Ethylene Vinyl Acetate (EVA)/Polyvinylidene Chloride (PVDC)/Ethyl Vinyl Acetate (EVA), Polyvinylidene Chloride (PVDC)/Polyvinylchloride (PVC) copolymer, or nylon/Surlyn (DuPont ionomer), to manufacture bags for preserving bulk cuts of meats and other perishables. Most of the bags are formed from composite films made from two sheets of the composite film or formed into tubes.

It has been found that bags manufactured from the nylon/Surlyn composite film provide all the desirable characteristics for preservation and storage of meats and other perishables. However, the presently used nylon/Surlyn film is produced by co-extrusion. Again, it has been found that the bond between the co-extruded nylon/Surlyn is of low quality and inconsistent. For example, the bond strength of a presently known co-extruded nylon/Surlyn varies from 30 to 80 grams per inch of width. Nevertheless, one of the advantages of co-extruding the nylon/Surlyn film is the avoidance of the so-called "flash wrinkles" which create random lines of weakness in the nylon film, which occur when extrusion coating nylon film with a sufficient quantity of heat sealable plastic. The cause of the flash wrinkles is believed to be the rapid absorption of heat from the mass of molten heat sealable plastic.

When using bag film web material, the webs are cut into proper size sheets and are sealed together on three sides to form a bag while the tube type structures are sealed and cut into bags into which the meat cut is placed. Generally, the producers strive for a totally transparent or clear bag material so that, when used to package meat, the fresh meat color can be seen through the bag. When using this type of bag material, normally a dusting process is used to introduce a non-sticking substance, such as some form of starch dust (corn starch) onto the contacting inside surfaces of the bag to prevent the inside surfaces of the bag from sticking together due to static electricity or cohesion and blocking, thus, permitting the bags to be opened more easily to introduce the meat cuts.

After the meat cut is placed into these presently known bags, the bags are placed in a standard vacuum sealing chamber where a vacuum is drawn on the bag. The open end of the bag is sealed to completely seal the bag while in the vacuum chamber. Although this method of packaging has been widely used, there are some disadvantages which the present invention will eliminate. The present invention also avoids the flash wrinkle problem which usually occurs when extrusion coating nylon film with a sufficient quantity of molten thermoplastic material makes storage bag structures.

SUMMARY OF THE INVENTION

It is, therefore, an object of this invention to provide a film material which can be used to form heat sealable packages whereby visual inspection of the package can be made to determine if a proper seal is present.

Another object of this invention is to provide a method of packaging perishables in which a visual inspection is provided to produce an immediately recognizable indication that the package is improperly sealed.

Another object of this invention is to provide a packaging film having a matte surface which will minimize the static electric charge and the cohesion and blocking problem normally found in film bags, thereby eliminating the requirement for a dusting process.

These and other objects are accomplished by the present invention through the use of a composite film structure constructed of two or more plys of a plastic film such as nylon, polyethylene and DuPont's Surlyn which is a co-polymer of ethylene and acrylic acid with the acid neutralized with sodium or zinc. Each ply of the film has specific properties desirable for vaccum packaging fresh cuts of meat or other perishables. For example, nylon provides toughness and a desirable level of gas barrier property. The polyethylene provides a common bonding material between a primed nylon surface and an outer sealing layer while also reducing the cost of the structure. The Surlyn for the inner sealing layer provides a low temperature heat seal and sealing strength.

Each ply or layer of film in the composite is inherently substantially transparent, but the sealing surface of the inner layer of Surlyn is matted during manufacturing to produce a translucent or frosted appearance. Sheets of the composite film are formed into flat bags with three sides sealed with the matte finish of the sheets on the inside of the bag. When using the bags to package meat cuts, the cut is placed in the bag, a vacuum is drawn on the bag and the fourth or open side of the bag is then sealed.

Sealed bag and contents are then passed through a heat tunnel where the contacting composite film surfaces are fused together by a combination of heat and pressure, thus, returning the composite film to its normally transparent state.

BRIEF DESCRIPTION OF THE DRAWINGS

The foregoing and additional objects, features and advantages of the present invention will be apparent to those skilled in the art from the following detailed description of a preferred embodiment thereof, taken with the accompanying drawings, in which.

DESCRIPTION OF A PREFERRED EMBODIMENT

Figure 1:
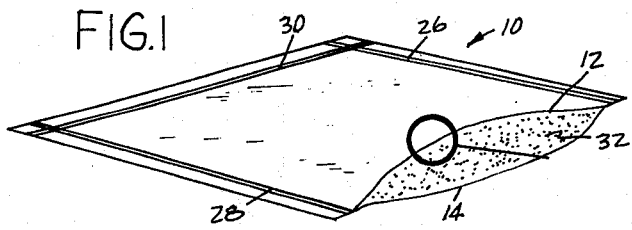
FIG. 1 is a perspective of a storage bag according to the present invention.
Figure 2:
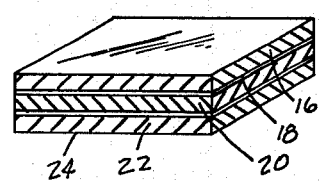
FIG. 2 is a detail of one embodiment of the composite film structure according to the present invention.

Referring more particularly to the drawings, in FIG. 1 the numeral 10 is a storage bag constructed from two sheets 12 and 14 of a composite film structure. The film structure includes an outer layer 16 (see FIG. 2) of nylon, such as Allied Chemical 77C between 0.75 mils and 2 mils in thickness; an adhesion promoter or catalytic primer coating 18, such as DuPont 56065; an intermediate layer 20 of low density polyethylene (LDPE) between 0.5 and 1.5 mils in thickness, and an inner sealing layer 22 such as DuPont's Surlyn which is a co-polymer of ethylene acrylic acid with the acid neutralized with sodium or zinc. The inner layer is between 0.5 and 1.5 mils in thickness. The external surface 24 of the sealing layer 22 has a matte finish to produce a translucent or frost appearance. Each of the other layers are transparent, therefore, the matte finish of the sealing layer causes the entire film composite to have a frosted appearance. It has been found that the ideal thickness of the layers are 1.5 mils for the outer layer and 1 mil for each of the intermediate and inner layers.

The outer layer of the film composite should provide toughness to prevent puncturing and tearing as well as a suitable gas barrier feature. For instance, the puncture resistance value of the outer layer should be between 750 to 800 lbs./in$^2$ and the tear resistance value should be between 0.75 to 0.85 lbs. The puncture resistance values were determined by placing a flat faced punch having a known surface area against the film and measuring the resistance to rupture with an Instron tester while the tear resistance values were calculated by using the standard Elmendorf tear test. The outer layer should have an oxygen transmission rate of less than 1 cc/400 in$^2$/24 hrs. measured by the standard gas transmission test. The intermediate layer which provides a common bonding material between the prepared outer layer and sealing layer should have a bond strength between 1 to 1¼ lbs./in. of width. Low density polyethylene has been found to have good bonding characteristics for a wide variety of thermoplastic as well as having a low cost. The inner or sealing layer should be a material with a low sealing temperature of between 200°–230° F. and a seal strength between 10 to 14 lbs./in. of width. The bond and seal strength figures were determined by the standard test to measure resistance to separation.

When manufacturing the composite film material, a continuous web of nylon is first coated with the adhesion promoter 18 to prepare the surface of the nylon. The intermediate polyethylene layer 20 is then applied over the prepared surface with the outer heat sealing layer 22 applied to the polyethylene layer. The external surface 24 of the sealing layer is contacted by a chill roll to produce a matte surface which produces the frosted or translucent appearance.

By using the adhesion promoter 18 and the intermediate low density polyethylene layer bond between the polyethylene layer nylon and nylon layer is achieved. For example, the bond strength between the nylon layer 16 and polyethylene layer 20 has been found to be consistently in the range of 450 to 500 grams per inch of width. It has also been found that, by first applying the low density polyethylene layer 20 to the nylon and then extruding the Surlyn layer, the flash wrinkles in the nylon film are avoided due to the prevention of the large transfer of heat from the molten plastic directly to the nylon.

The composite film material is then fed through a slitter and sealing apparatus so that the sheets are slit into bag widths and sealed along their edges and at spaced intervals along the sheet length. The sealed sheets are then cut into bags having the side edges and one end edge sealed together along side sealing lines 26 and 28 and end sealing line 30 (see FIG. 1). The inside surface 32 of the bag has a matte finish producing a frosted appearance. Along each sealed line 26, 28 and 30, the bag is transparent or clear due to the fusion of the composite materials together during the sealing operation. This provides a visual inspection to insure the bag is properly sealed.

Figure 3:
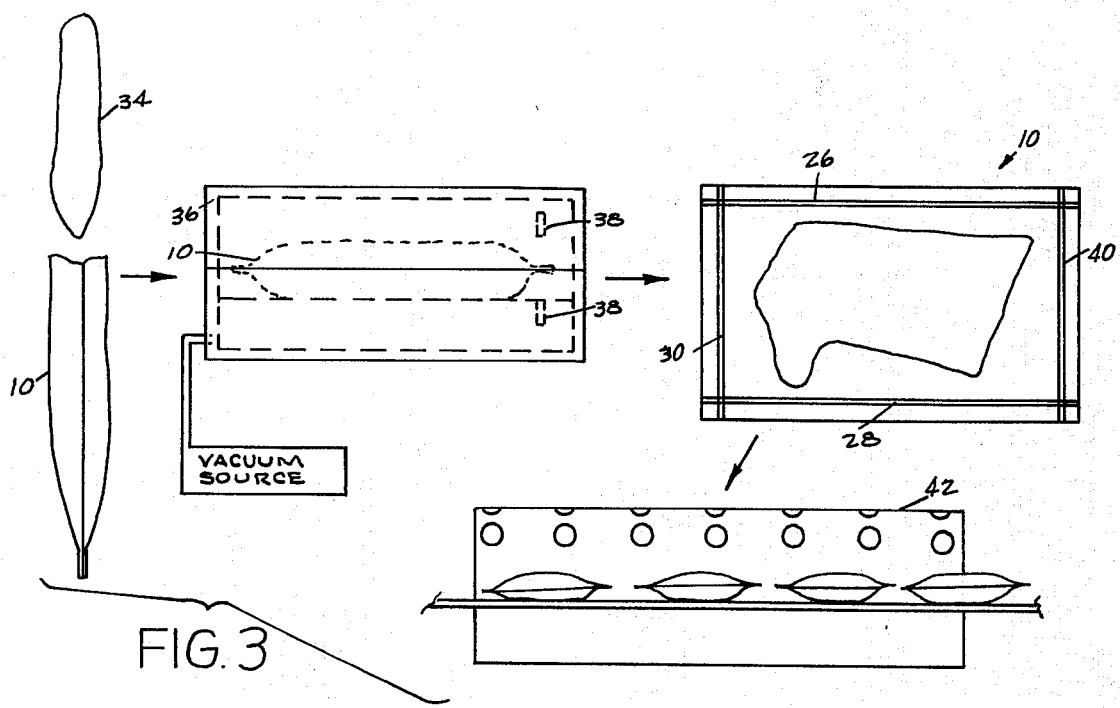
FIG. 3 is a perspective of the packaging process line according to the present invention.
Figure 4:
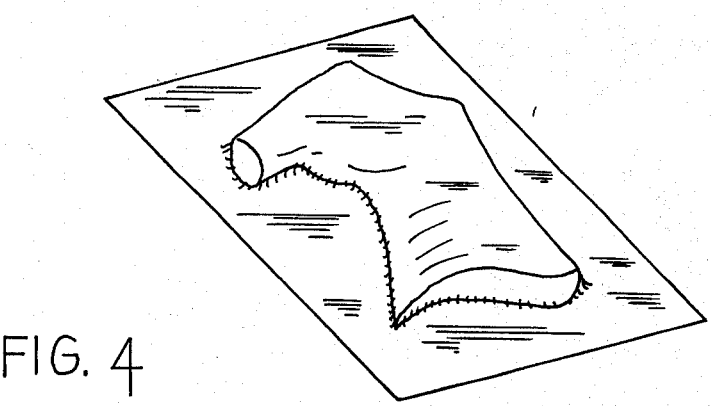
FIG. 4 is a perspective of a filled storage package resulting from the process illustrated in FIG. 3.

The bag 10 can be used to package various types of perishables, such as fresh bulk cuts of meat. As can be seen in FIG. 3, a meat cut 34 is placed into a bag 10. The bag and contents are then placed in a standard vacuum sealing chamber 36 where a vacuum is drawn on the bag and heat sealing elements 38 produce a seal line 40 across the open end of the bag 10. Again, the seal line 40 becomes transparent, thus, providing a visual inspection to determine if proper sealing has been obtained. The seal bag is then passed through a hot air or hot water heat tunnel 42. When the bag is passed through the heat tunnel, all contacting portions of the two sheets of composite film are fused together, thus, making the bag become transparent. The transparency of contacting surfaces of the bag provides visual inspection as well as additional seal strength. It has also been found that when a meat product contacts the inner surface of the bag, the bag material loses its translucent appearance and becomes clear presumably due to the liquids contained in the meat contacting the matte finish.

When using bags made from the above described composite film material in a hot air heat tunnel, the preferred temperature for the heat sealing process is 300° F. for approximately 9 seconds. When using a hot water heat tunnel, the bag is completely sealed in 1 second at a water temperature of 200° F.

From the above description, it can be seen that, the present invention provides a composite film material which can be used for a heat sealable package whereby a visual inspection of the package can be used to determine if the proper sealing is present. The matte inner surface of the bag film minimizes the static electric charge and substantially reduces the cohesive and blocking problem to eliminate the requirement for the usual dusting process.

As will be apparent to those skilled in the art, there are many variations and changes which can be made in the bag structure itself and in the process for making the bags. For example, the intermediate layer of the composite film can be eliminated and the sealing layer thickness can be increased. However, these and other variations and changes can be made in the invention as described above and illustrated without departing from the true spirit and scope thereof as defined in the following claims.

What is claimed is:
1. A composite film comprising:
   a. a first outer layer of transparent nylon film having a thickness between 0.75 mils. and 2 mils., a puncture resistance value of between 750 to 800 lb./in.$^2$, a tear resistance value between 0.75 to 0.85 lbs. and an oxygen transmission rate of less than 1cc/400 in.$^2$/24 hours;
   b. an intermediate layer of transparent low density polyethylene having a thickness between 0.5 mils. and 1.5 mils.;
   c. said nylon layer and said polyethylene layer bonded to each other by an adhesion promoter to provide a bond strength in the range of 450 to 500 grams per inch of width, said adhesive promoter being a primer coating applied to said nylon film prior to bonding said nylon film to said polyethylene, and, d. a second outer layer of heat sealable, ionomer film, bonded to said polyethylene layer, which is an ethylene-acrylic acid copolymer partially neutralized with sodium or zinc, said ionomer film having an external matte finished surface which is translucent, formed by contacting said ionomer film with a chill roll, said ionomer film having a heat sealing temperature of 200°–230° F. and a seal strength between 10 to 14 lbs./in. of width.

* * * * *